(12) United States Patent
Ng et al.

(10) Patent No.: US 7,690,021 B2
(45) Date of Patent: Mar. 30, 2010

(54) COMBINING MULTIPLE SIMULTANEOUS SOURCE CINEMA TO MULTIPLE EXHIBITOR RECEIVERS

(75) Inventors: Joseph S. Ng, Montebello, CA (US); Robyn M. Akers, Torrance, CA (US); Lester A. Chew, Culver City, CA (US)

(73) Assignee: The Boeing Company, Chicago, IL (US)

( * ) Notice: Subject to any disclaimer, the term of this patent is extended or adjusted under 35 U.S.C. 154(b) by 1769 days.

(21) Appl. No.: 10/360,019

(22) Filed: Feb. 7, 2003

(65) Prior Publication Data

US 2003/0204850 A1 Oct. 30, 2003

Related U.S. Application Data

(63) Continuation-in-part of application No. 10/213,396, filed on Aug. 6, 2002, now abandoned.

(60) Provisional application No. 60/376,240, filed on Apr. 29, 2002, provisional application No. 60/376,333, filed on Apr. 29, 2002.

(51) Int. Cl.
  *H04N 7/173* (2006.01)
  *H04N 7/20* (2006.01)
  *H04N 7/167* (2006.01)
(52) U.S. Cl. .............................. 725/91; 725/63; 725/65; 725/93; 725/31
(58) Field of Classification Search .................. 725/63, 725/65, 91
  See application file for complete search history.

(56) References Cited

U.S. PATENT DOCUMENTS

| 5,894,320 | A | * | 4/1999 | Vancelette | .................. 725/138 |
| 5,982,363 | A | | 11/1999 | Naiff | |
| 6,141,530 | A | | 10/2000 | Rabowsky | |
| 6,384,893 | B1 | | 5/2002 | Mercs et al. | |
| 6,564,380 | B1 | * | 5/2003 | Murphy | ........................ 725/86 |
| 6,675,386 | B1 | * | 1/2004 | Hendricks et al. | ........... 725/105 |
| 6,772,191 | B1 | * | 8/2004 | Kurosawa et al. | ........... 709/203 |

(Continued)

FOREIGN PATENT DOCUMENTS

WO    WO 99/59335    11/1999

OTHER PUBLICATIONS

Kirovski et al., "Digital Rights Management for Digital Cinema," Inter. Symp. on Optical Science & Tech.—Security in Imaging: Theory & Applications, San Diego, CA, Jul. 2001, 16 pages.*

(Continued)

*Primary Examiner*—John W Miller
*Assistant Examiner*—Chris Parry
(74) *Attorney, Agent, or Firm*—Gates & Cooper LLP

(57) ABSTRACT

An apparatus and method for combining multiple simultaneous sources to multiple exhibitor receivers in a secure manner is disclosed. An exemplary system includes a plurality of live event sites each producing and transmitting a live video source. A live event director system is used for receiving and combining each transmitted live video source in an overall transmission and transmitting the overall transmission for exhibition. A network operation center coordinates encryption of the overall transmission at the live event director system and decryption of the overall transmission by at least one authorized exhibitor site. In further embodiments, the live event sites selectively transmit high bandwidth signals to reduce bandwidth usage.

26 Claims, 6 Drawing Sheets

U.S. PATENT DOCUMENTS

| 6,903,681 | B2* | 6/2005 | Faris et al. ............. 342/357.06 |
| 2001/0039180 | A1 | 11/2001 | Sibley et al. |
| 2001/0039662 | A1 | 11/2001 | Sibley |
| 2001/0039663 | A1 | 11/2001 | Sibley |
| 2001/0039664 | A1 | 11/2001 | Sibley |
| 2001/0053700 | A1 | 12/2001 | Sibley |
| 2002/0095679 | A1 | 7/2002 | Bonini |
| 2002/0129371 | A1 | 9/2002 | Emura et al. |
| 2002/0188943 | A1* | 12/2002 | Freeman et al. ............... 725/38 |
| 2004/0064836 | A1* | 4/2004 | Ludvig et al. ................. 725/95 |

OTHER PUBLICATIONS

Morley, S., "Making Digital Cinema Actually Happen—What it takes and Who's Doing It." QUALCOMM, Incorporated, 17 pp., Oct. 31, 1998.

Stromberg, M., "Secure Content Protection: An Overview of the Proposed Security Mechanisms in Digital Cinema", KTH Advanced Media Technology Lab, Online! Sep. 20, 2001, Stockholm, XP-002249975, retrieved from the Internet: URL: www.amt.kth.es on Aug. 1, 2003, 17 pp.

Kirovski et al., "Digital Rights Management for Digital Cinema," Inter. Symp. on Optical Science & Tech.—Security in Imaging: Theory & Applications, San Diego, CA, Jul. 2001, 16 pages.

National Association of Theatre Owners; "Digital Cinema User Requirements," Feb. 22, 2002, pp. 1-3.

Hose et al., "Data Transport and Processing in a Digital Cinema Theatre System," Qualcomm Incorporated from the 36$^{th}$ Advanced Motion Imaging Conference, Feb. 7-9, 2002, 21 pages.

* cited by examiner

COMBINING MULTIPLE SIMULTANEOUS SOURCE CINEMA TO MULTIPLE EXHIBITOR RECEIVERS

CROSS-REFERENCE TO RELATED APPLICATIONS

This application claims the benefit under 35 U.S.C. §119 (e) of the following co-pending and commonly-assigned U.S. patent application, which is incorporated by reference herein:

U.S. Provisional Patent Application No. 60/376,240, filed Apr. 29, 2002, by Joseph S. Ng, Robyn M. Akers and Lester A. Chew and entitled "COMBINING MULTIPLE SIMULTANEOUS SOURCE CINEMA TO MULTIPLE EXHIBITOR RECEIVERS".

This application is a continuation-in-part of the following co-pending and commonly-assigned U.S. patent application, which is incorporated by reference herein:

U.S. patent application Ser. No. 10/213,396, filed Aug. 6, 2002, by Joseph S. Ng and entitled "BANDWIDTH EFFICIENT AND SECURE METHOD TO COMBINE MULTIPLE LIVE EVENTS TO MULTIPLE EXHIBITOR" which claims the benefit of U.S. Provisional Patent Application No. 60/376,333, filed Apr. 29, 2002.

This application is related to the following co-pending and commonly-assigned U.S. patent applications, which are both incorporated by reference herein:

U.S. Provisional Application Serial No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION"; and U.S. Provisional Application Ser. No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY".

BACKGROUND OF THE INVENTION

1. Field of the Invention

The present invention relates to systems and methods for transmitting live events to multiple viewing locations. Particularly, this invention relates to transmitting secure live events from multiple simultaneous sources and locations to multiple exhibitors.

2. Description of the Related Art

Although it is currently possible to combine multiple simultaneous live source of events and transmit to multiple exhibitors worldwide in standard TV or HDTV quality, it is very difficult and expensive to do so. A key source of the expense is the large bandwidth that such high quality signals require. At present, there are no systems which combine multiple simultaneous live source events and distribute to multiple exhibitors at cinema quality level.

In addition, for most practical uses of cinema quality events, the transmission must be made secure so that only authorized receivers are able to make use of it. At present there are no systems for distributing such live multiple source events to multiple exhibition locations that operate in a secure manner to prevent unauthorized reception of the transmission.

Accordingly, there is a need for systems and methods for combining and delivering cinema quality live events from multiple sources in a cost effective manner. There is also a need for such systems and methods to enable such broadcast events in a secure manner. Finally, there is a need for such systems to operate in a bandwidth efficient manner. The present invention meets all these needs.

SUMMARY OF THE INVENTION

The present invention provides a method to combine multiple simultaneous live events at different locations with cinema quality broadcast worldwide. This invention combines various technologies together to provide a new technological service, the ability to broadcast multiple simultaneous sources of live events in high definition or cinema quality to multiple exhibitors in a secure manner. The present invention combines compression, encryption, satellite telecommunication, decompression, decryption and image processing technologies.

This invention provides a system and method for combining multiple simultaneous sources of live events in high definition or cinema grade quality to distribute to multiple exhibitors worldwide in a secure manner. The invention allows the live events site to be anywhere within a satellite coverage.

A typical system embodiment of the invention includes a plurality of live event sites each producing and transmitting a live video source. A live event director system is used for receiving and combining each transmitted live video source in an overall transmission and transmitting the overall transmission for exhibition. A network operation center coordinates encryption of the overall transmission at the live event director system and decryption of the overall transmission by at least one authorized exhibitor site.

Because all final editing of the overall transmission takes place at the single live event director system, there is no need to provide duplicate equipment for such things as time shift recording/play back, special effects, text overlays and other special processes at each of the live event sites where the separate live video sources are produced; the live event sites need only supply raw video footage and sound. In addition, encryption of the overall transmission is easily coordinated between the network operation center and the exhibition sites. The same encryption may be universally applied to the overall transmission as well as the raw video sources from the live event sites, although the video sources are less critical. Furthermore, the present invention eliminates the need for ultra high precision synchronization between the live event sites, as all the live video sources are first transmitted to the live event director system; the live event director system can compensate for any delays or dropped signals from a live event site by switching an alternate live event site (or other stored video) into the overall transmission.

Finally, in further embodiments the live video sources from live event sites to the live event director system can be managed in a manner to improve the overall bandwidth efficiency of the system. Lower resolution signals (low bandwidth) are used to monitor the live video sources to save bandwidth. When the director requires a particular video source in the final edited overall transmission, a high quality (high bandwidth) signal for that source is transmitted to the live event director system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

Figure 1:
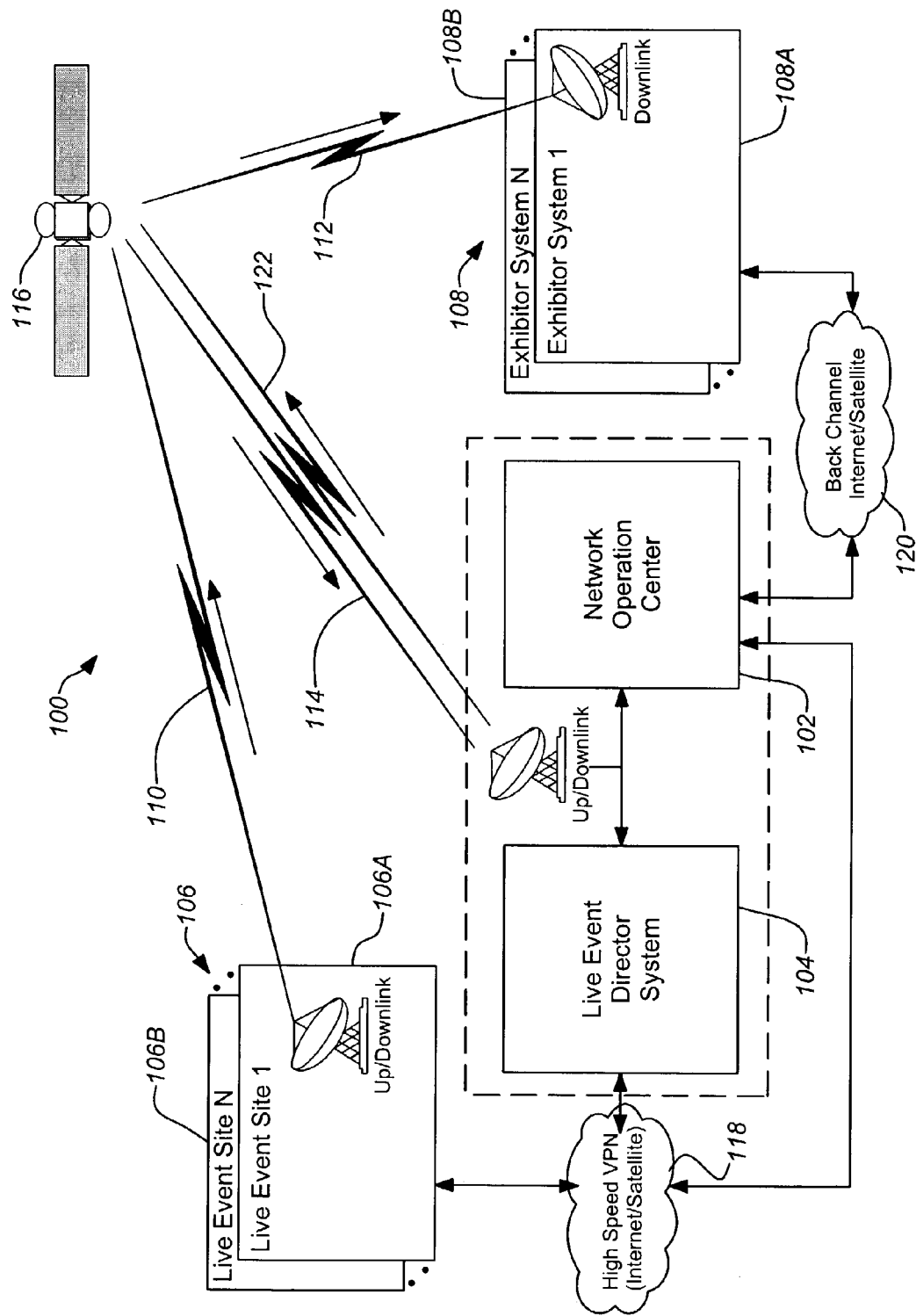
FIG. 1 illustrates a basic architecture of an exemplary system of the present invention.

FIG. 1 illustrates a basic architecture of an exemplary system of the present invention. There are four major subsystems used by the system 100, the network operation center 102 (NOC), the live event director system 104 (LEDS), a plurality of live event sites 106 (LES) (individually designated as 106A, 106B, etc.) and one or more exhibitor systems 108 (ES) (individually designated as 108A, 108B, etc.). The live event director system 104 and the network operation center 102 are generally located at the same facility to share a common uplink/downlink antenna and other resources, although they may be separately located.

The live event sites 106 each provide a high quality (e.g., high definition or cinema quality) live video source transmission (including audio) for potential inclusion in the overall transmission via a satellite uplink 110. The live event director system 104 receives each of the live video sources from each of the live event sites 106 through the downlink 114. The live event director system 104 includes a display and selection system for editing together a single high quality overall transmission signal from the separate live video sources of the plurality of live event sites 106. The overall transmission is then transmitted from the live event director system 104 over the uplink 122. Each exhibitor system 108 receives the overall transmission, transmitted from the live event director system 104, via satellite links 122 and 112. Although alternate delivery methods are possible, generally the overall transmission is broadcast to exhibitor systems 108 through one or more satellites 116.

The network operation center 102 manages access control of the exhibitor systems 108 to the overall transmission. Although each satellite link 110, 112, 114 and 122 may incorporate encryption to protect the content from unauthorized reception, encryption for the overall transmission content (over links 122 and 112) is particularly important as this is the final product to be received by the exhibitor systems 108. The network operation center 102 facilitates coordination of the encryption and decryption keys between the various entities (live event sites 106, live event director system 104 and exhibitor systems 108) transmitting and receiving the live event content.

There are some advantages to forming the overall transmission signal from the multiple live video sources received at a single point (the live event director system 104) for redistribution to the exhibitors. Were the overall transmission transmitted directly from the multiple separate live event sites 106 to the exhibitors 108, it would require very precise timing to ensure that the overall transmission was presented seamlessly to the exhibitors as the transmitted signal is switched among the live event sites. Particularly, it would be necessary to precisely synchronize the change from one live event site transmission to another to prevent any dead air or interference. Also, to manage transmissions directly from the live event sites 106 to the exhibitors 108 the same encryption would have to be coordinated between all of the live event sites 106 as well as all of the exhibition systems. Finally, transmission from the separate live event sites 106 would require all final edit processing to be performed at each of the live event sites 106. Thus, equipment for special processing (time shift recording/play back, special effects, text overlays, etc.) and other modifications would have to be duplicated at each live event site 106.

In the description hereafter, the details of the subsystems of FIG. 1 and the method of operation will be further described.

2. Exhibitor System

Figure 2:
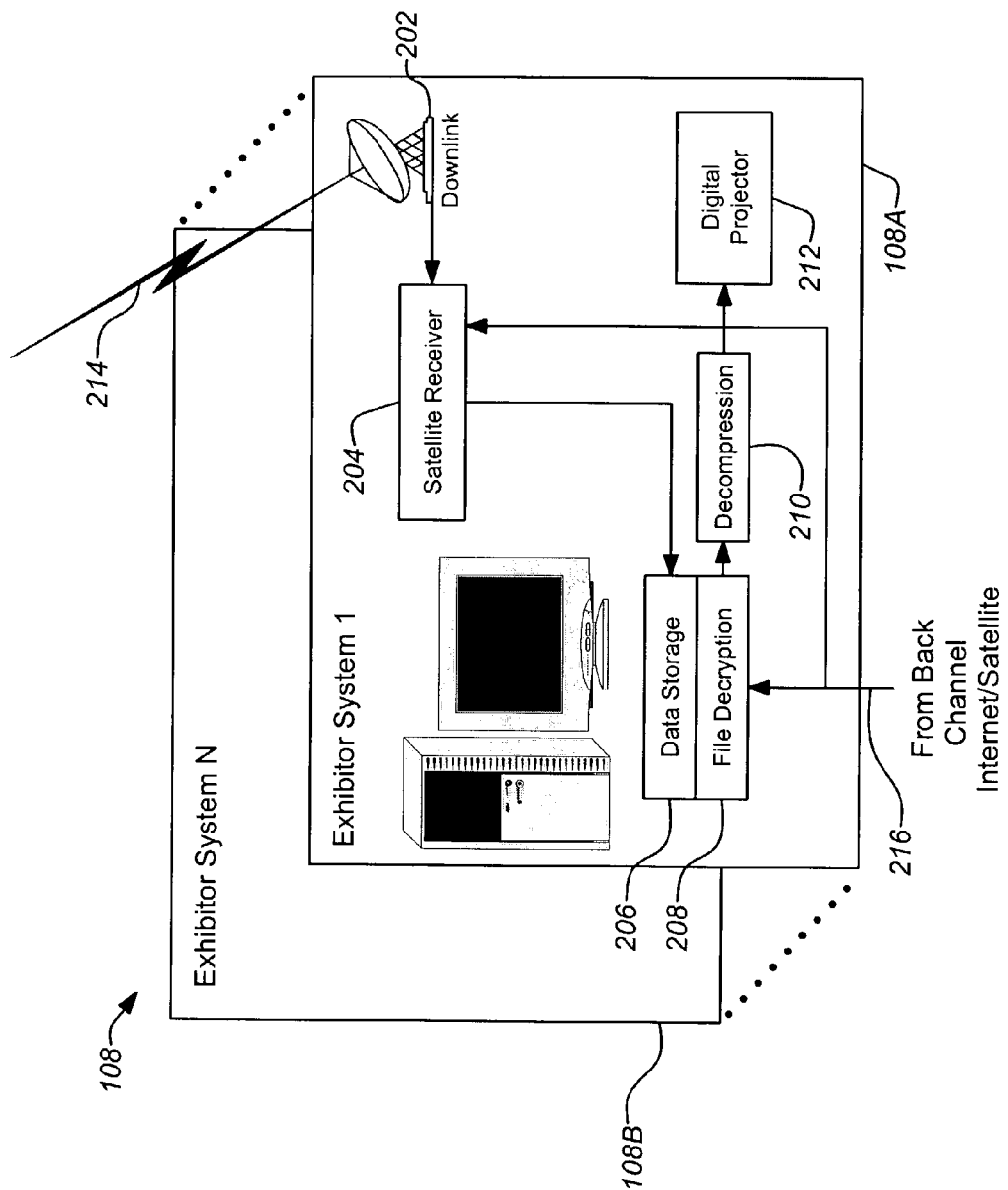
FIG. 2 illustrates the details of an exemplary exhibitor system.

FIG. 2 illustrates the details of an exemplary exhibitor system 108. An exhibitor system 108 is provided so that patrons can view a transmitted multi-sourced live event, i.e. the overall transmission (represented by signal 214 in FIG. 2) from the live event director system 104. An exhibitor system 108 is located at each of one or more N exhibition locations as shown in FIG. 1. There is no limit to the number of exhibition locations; they can number in the tens of thousands. There are six major components in a typical exhibitor system 108, the down link antenna 202, satellite receiver 204, data storage 206, a decryption unit 208, a decompression unit 210, and a display device 212 (e.g., a digital projector or other suitable device).

The downlink antenna 202 and satellite receiver 204 are used to receive the signal 214 from the satellite 116, if the exhibitor is authorized to receive this event, the receiver will perform condition access (transmission) decryption from the signal 214. The data storage 206 is used to buffer the received data of the overall transmission. Buffering the data can assure an uninterrupted presentation even if the transmission of the overall transmission is temporarily interrupted. In addition, data storage 206 can be used to store the entire live event (i.e. the overall transmission), so that it may also be replayed at the exhibition location at a later time. When the event is exhibited (live, delayed or replayed), the received data is passed to the decryption unit 208.

The decryption unit 208 performs file decryption functions at real time. Access authorization is confirmed via a communication link 216 to the decryption unit 208 from the network operation center 102. The communication link 216 supplies the proper decryption keys. The communication link 216 can be implemented in a variety of ways, such as wireless, satellite, telephone, VPN, internet connection and/or any other suitable connection. The keys for condition access (transmission) decryption and conditional access decryption can be communicated together over the same link or separate links. Preferably, the communication link 216 comprises an Internet connection, such as a back channel Internet connection 120. Furthermore, the link 216 should provide its own encryption for added security to the keys.

Once decrypted, the data is then passed to the decompression unit 210. The decompression unit 210 restores the received compressed signal back to its original form just before it is relayed to the display device 212 for presentation to the audience. To provide yet more security to the transmission, the final relay from the storage device to the display device 212 can be separately encrypted and decrypted within the display device as the video is presented. The display device 212 is used to display the received decrypted and decompressed image. For example, a digital projector can be used to project the high definition or cinema quality image to a screen.

In one embodiment, condition access (transmission) decryption and decompression are performed upon receipt of the signal and the output is cached to data storage 206. When the video is to be displayed (immediately, in the case of a live broadcast), the conditional access decryption is performed actively as the video is transferred from data storage 206 to the display device 212. Thus, the received video of the overall transmission is stored on the data storage 206 with only the file encryption applied. The file access key must be available if the received video is to be replayed.

3. Live Event Site

Figure 3:
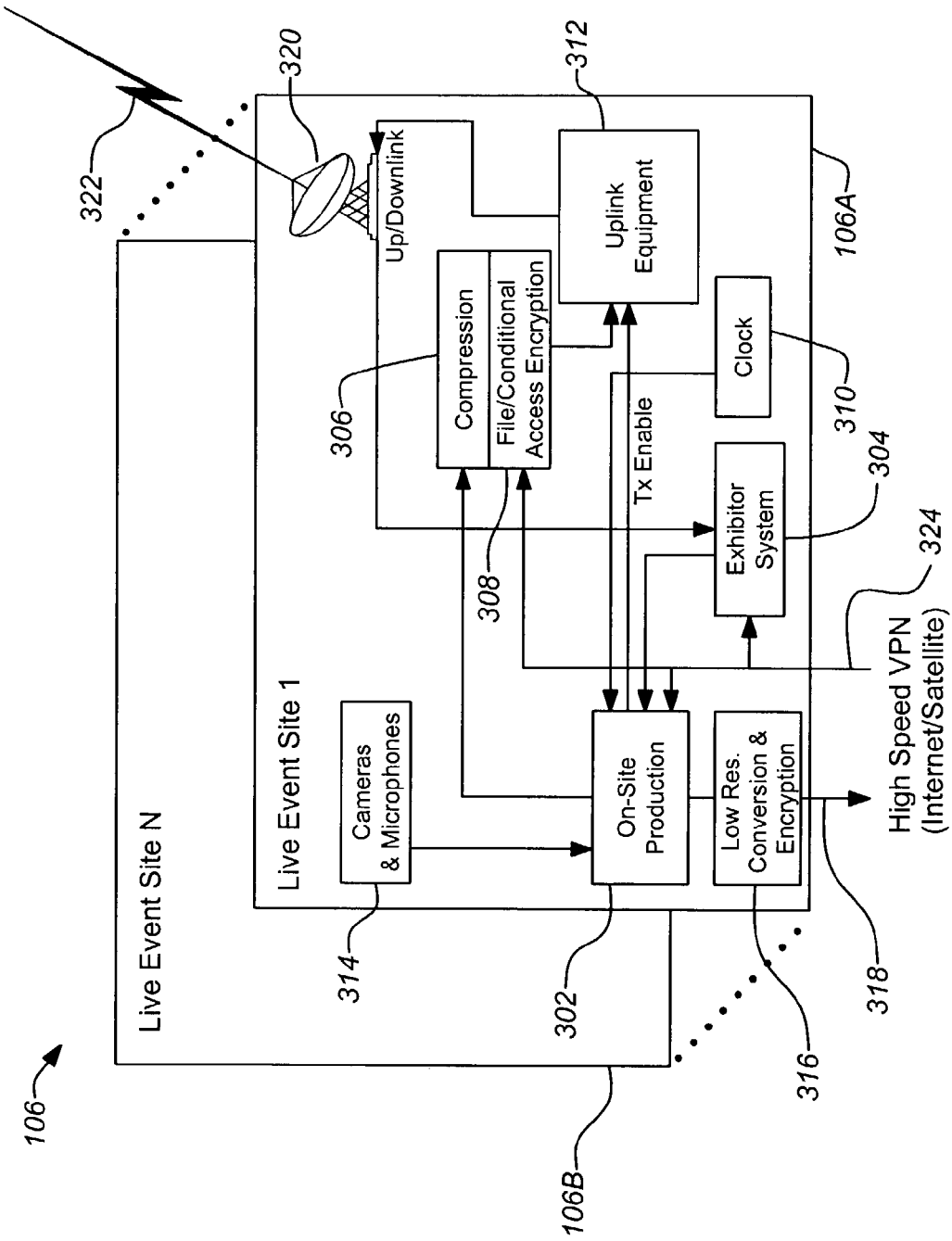
FIG. 3 illustrates the details of an exemplary live event site system.

FIG. 3 illustrates the details of an exemplary live event site system 106. A live event site system 106 is located at each of the live event sites; the overall system 100 can operate using numerous live event sites. There are six major components in each live event site system 106, an on-site production unit 302, an exhibitor system 304, a compression unit 306, a file encryption unit 308 and up-link equipment 312. Each live event site contains input devices 314, such as one or more cameras and microphones to provide raw video and audio to the live event director system 104. The input devices 314 are connected to the on-site production unit 302. The on-site production unit 302 prepares the high definition or cinema quality video and audio streams. However, as previously mentioned, it is not necessary for finish processing such as special effects, text overlays and other processing to be performed at the live even site 106, as these modifications can be added at the live event director system 104. Thus, the expense of specialized editing equipment at each of the live event sites can be avoided.

An on-site director directs and coordinates the production activity at the live event site system 106. The on-site director may act autonomously or at the direction of a central director at the live event director system 104. The high definition or cinema quality digital video signal produced from the on-site production live event site system 106 is one of the plurality of live video sources for combination in the overall transmission.

The raw high definition or cinema quality digital video is compressed 306 and encrypted 308 and then made available to the up-link equipment 312. The uplink equipment 312 communicates the processed signal to the antenna 320 for transmission to the satellite 116 through uplink 110. The satellite 116 transmits the high quality video of the signal 322 to the exhibitor systems 108.

The encryption unit 308 can perform both file encryption and conditional access encryption. The encryption can be performed using many possible techniques. For example, the encryption for both file and conditional access encryption can be based upon a hardware encryption (e.g., an application specific integrated circuit) that is part of the encryption unit. The conditional access encryption can be applied over the file encrypted data so that the received video can be "transmission" decrypted and then stored with the file encryption still applied. Upon viewing (live or replayed), the video is file decrypted in real-time.

Alternately, either or both encryption forms can be software based with paired keys (encrypt keys for the live event sites 106 and decrypt keys for the exhibitor systems 108) coordinated by the network operation center 102 through wireless, satellite, telephone or any other suitable link. For example, using the secure two-way VPN link (that also communicates controls from the live event director system 104), the encryption key(s) can be conveniently communicated to the live event sites 106 over this same link 324. In alternate embodiments, either or both the file and conditional access encryptions can be performed by hardware or software with or without paired encryption/decryption keys.

In addition, different encryptions (file and/or conditional access) can be employed for the transmissions to the live event director system 104 (from each of the live event sites 106) and the transmission of the overall transmission to the exhibitor systems 108 (from the live event director system 104). The alternate encryptions can differentiate the "raw" footage supplied from the live event sites 106 and the overall transmission, representing the finished product from the live event director system 104. For example, in some embodiments, file encryption need only be applied to the final edited overall transmission from the live event director system 104 to the exhibitor systems over links 122 and 112, whereas only conditional access encryption is applied to the raw video sources over links 110 and 114.

In further embodiments of the invention, overall bandwidth required by the system can be optionally reduced by transmitting only a low resolution video signal to the live event director system 104 unless the video signal is needed for the edited overall transmission. As shown in FIG. 3, the on-site production unit 302 provides a signal to a low resolution conversion and encryption unit 316 which converts the high quality signal to a lower bandwidth and encrypts it for security. This low bandwidth signal is then communicated via link 318 to the live event director system 104. In one example, the low bandwidth signal is transmitted over a virtual private network (VPN). Alternately, the low bandwidth signal may be communicated over satellite, radio or any other acceptable means. Control to the uplink equipment 312 to enable (and disable) transmission (Tx enable) of the high quality signal to the live event director system 104 is provided through link 324 (which may also be implemented through the VPN or other means). Synchronization of the high quality signal transmission between the live event site 106 and the live event director system 104 is achieved through a clock 310.

Further, although it is not required for operation of the invention, the live event site 106 can also include a local exhibitor system 304. The exhibitor system 304 operates in the same manner as the system shown in FIG. 2 and can be thought of as an additional exhibition site collocated with the live event site. To facilitate this the antenna 320 functions as both an uplink and downlink. The local exhibitor system 304 provides the live event on-site director with what the audience is viewing in high definition or cinema quality.

4. Live Event Director System

Figure 4:
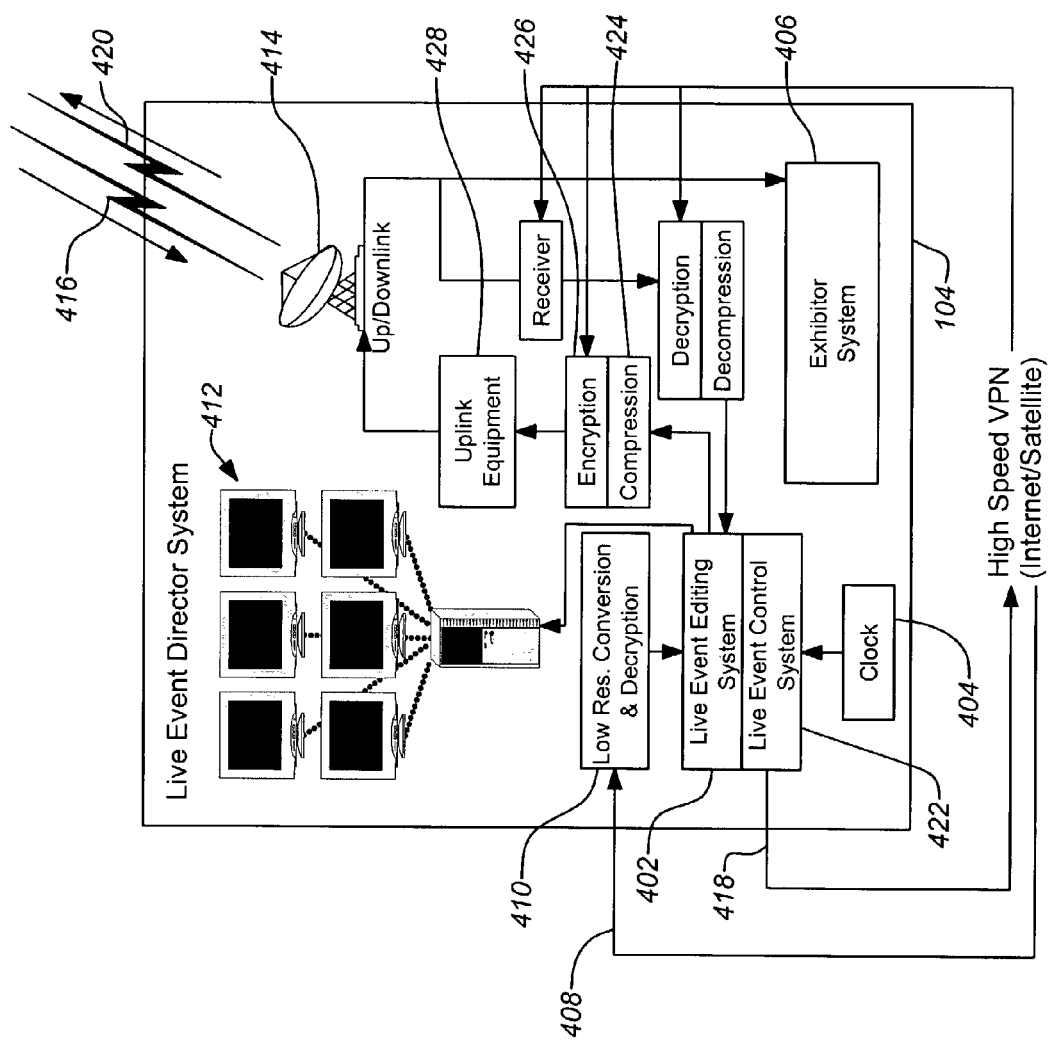
FIG. 4 illustrates a typical live event director system of the invention.

FIG. 4 illustrates a typical live event director system 104 of the invention. The live event director system 104 acts as a hub for all of the live video from the live event sites 106. An uplink/downlink antenna 414 is provided to receive the incoming live video sources (represented by signal 416) from the plurality of live event sites 106 over links 110 and 114. The received live video sources are decrypted in conditional access, file level, decompressed and communicated to the editing system 402 where they are combined and manipulated to produce the edited overall transmission which will then be transmitted to the exhibitor systems 108 in a secure manner. All of the received video sources from the live event sites 106 received by the downlink antenna 414 are high quality (e.g., cinema quality) video signals.

The high quality video output of the editing system 402 is the edited overall transmission that will be received by the exhibitor systems 108. The output is passed through a compression 424 unit, file and conditional access encryption 426 unit and then onto the uplink equipment 428 for transmission through the antenna 414. The edited overall transmission (represented by signal 420) can be broadcast out to all the exhibitor systems 108.

The live event director system 104 can be collocated with the network operation center 102, at a live event site 106 or at a studio, or it can be a stand alone system located at a separate location. Collocation will enable the system 104 to share equipment, such as the uplink/downlink antenna and/or exhibitor system 406. Alternately, if there is only one live event site 106, the live event director system 104 can be collocated with the live event site 106.

As discussed above with regard to the live event sites 106, bandwidth requirements of the overall system can also be reduced through a use of low bandwidth video source signals transmitted from the live event sites 106. The live event editing system 402 receives low resolution (such as 320×240) video from each live event site 106 through a low resolution link 408 (e.g., a high speed VPN 118). A processor 410 decrypts and decompresses the video streams and displays them on the monitors 412 for viewing. These low bandwidth transmissions are used to make editing decisions. The live event director system 104 can operate to enable and disable transmission of the counterpart high quality (high bandwidth signals) from each of the live event sites 106 as necessary to produce the edited overall transmission in high quality video. The live event director system 104 commands which live event site transmits (on-air) using a clock 404 as a common reference. Thus overall bandwidth usage can be reduced as fewer than all the available live video sources will be received in high quality at a given time.

The director at the live event director system 104 will determine which live event site 106 video source is needed to transmit in high quality for use in the overall transmission based on communication (through the high speed VPN) and the low bandwidth video from all live event sites 106. A live event director control system 422 (which can be combined with the editing system 402) will send a message communicated over a control link 418 specifying which live event site will transmit next and at what referenced time. The control link 418 can be conveniently communicated over the same VPN connection, however, it can also be communicated over a separate secure connection, e.g. wireless, telephone, satellite or other suitable link. If there is a live event site 106A currently transmitting, it will stop transmission at the commanded referenced time, and the selected live event site 106B will start transmission at the commanded referenced time.

Timing of the enabled and disabled transmissions can be implemented in a very precise manner using GPS clocks to synchronize the transmissions, however, such precision is not required because the editing system 402 of the live event director system 104 can compensate for any dropped frames or overlap before the edited overall transmission is communicated to the exhibitors. Moreover, it is advantageous that the architecture of the present invention allows for sloppy timing synchronization.

By allowing temporary overlap in the received video, clock synchronization of the transmission commands can be eliminated. Anticipating a transition from the current live event site 106A to a second live event site 106B within the edited broadcast to the exhibitors, the live event control system 422 will enable high quality transmission from the second live event site 106B before disabling the high quality transmission from the first live event site 106A. Only after the edited transition is complete will the high quality transmission of the first live event site 106A be disabled. Extending this principle, the cost in additional required bandwidth can be traded with editing flexibility.

For example, the system can be operated with one or more cued high quality transmissions being actively received from the live event sites 106 other than the current live event site 106 being transmitted to the exhibitor systems 108. For example, the system can employ one constant cued transmission which may be alternated among ten potential live event sites 106. The director can cut to the cued transmission instantly. As desired, the system can be expanded to enlarge the number of high quality transmission in the cued transmission pool. In this manner, it can be seen that bandwidth may be traded for editing spontaneity.

Finally, the optional exhibitor system 406 at the live event director site can be used to provide the live event director system 104 with the overall transmission that the audience is viewing at the remote exhibitor systems 108 in the high definition or cinema quality. The exhibitor system 406 operates in the same manner as the exhibitor system detailed in FIG. 2.

5. Network Operation Center

Figure 5:
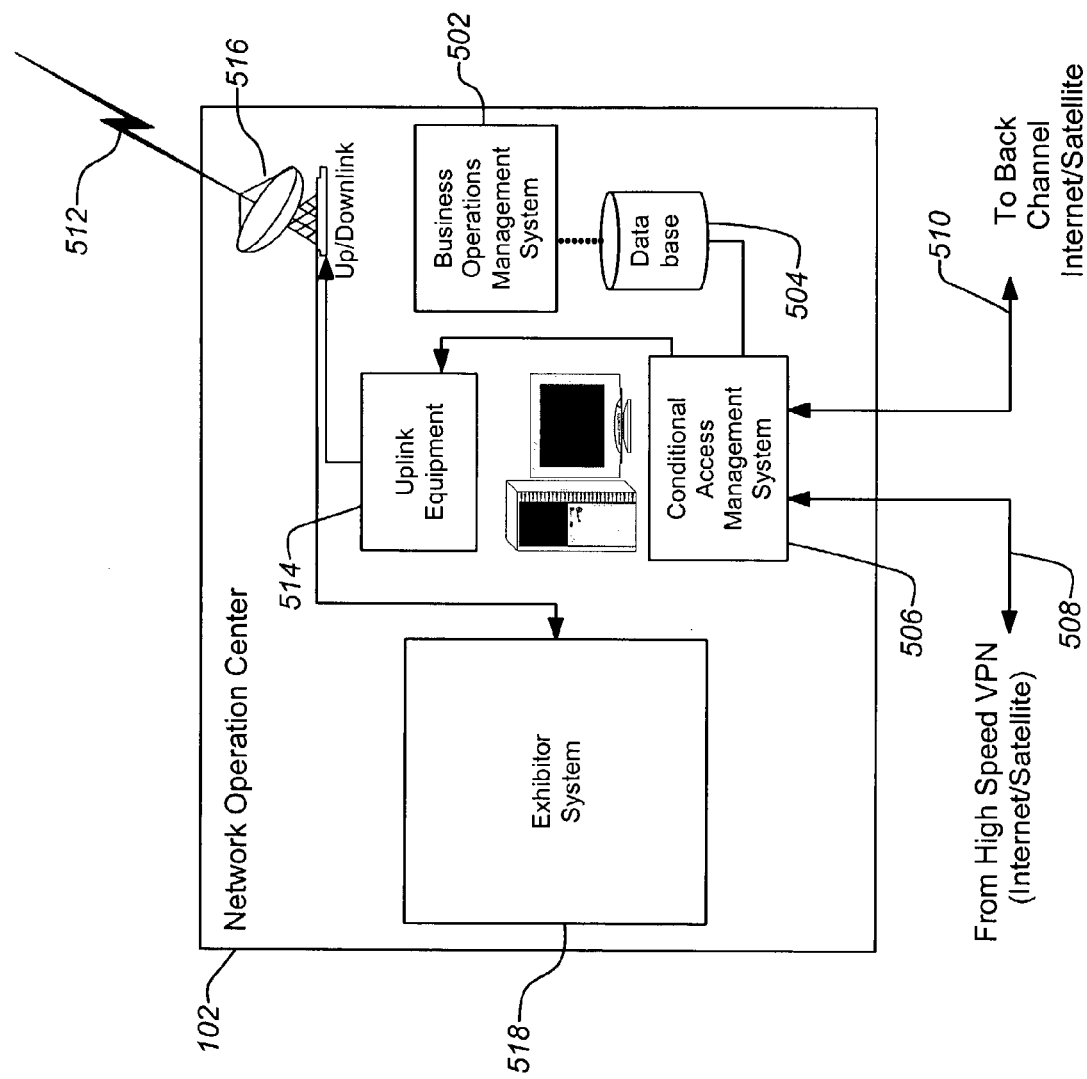
FIG. 5 illustrates a typical network operation center of the invention.

FIG. 5 illustrates a typical network operation center 102 of the invention. The network operation center 102 (NOC) is used to perform use and rights management for the overall transmission. The NOC 102 will provide file decryption keys and conditional access decryption keys to exhibitor systems 108 before the live event broadcast starts and/or add exhibitor systems 108 during live event broadcast.

The business operations management system 502 manages a database 504 of authorized exhibitor systems 108 and the events that they are authorized to exhibit. The conditional access management system 506 will communicate the proper conditional access encryption keys to the live event director system 104 (and, if necessary, the live event sites 106), e.g. over the VPN link 508. In addition, the conditional access management system 506 will communicate the paired decryption keys to the authorized exhibitor systems 108, e.g. over a back channel Internet link 510.

The conditional access decryption keys are also communicated by the NOC 102 to the exhibitor systems 108. The conditional access decryption keys can also be delivered via wireless, telephone or other suitable link, however they are typically delivered through a satellite transmission. For example, the conditional access decryption keys are communicated by satellite signal 512 through the uplink equipment 514 and antenna 516.

Just as with the live event director system 104 and the live event sites 106, the network operation center 102 can use an exhibitor system 518 to monitor what the audience is viewing in the high definition or cinema quality. The exhibitor system 518 of the network operation center 102 operates in the same manner as the exhibitor systems 108 shown in FIG. 2.

6. Secure Multiple Source Live Event Method

Figure 6:
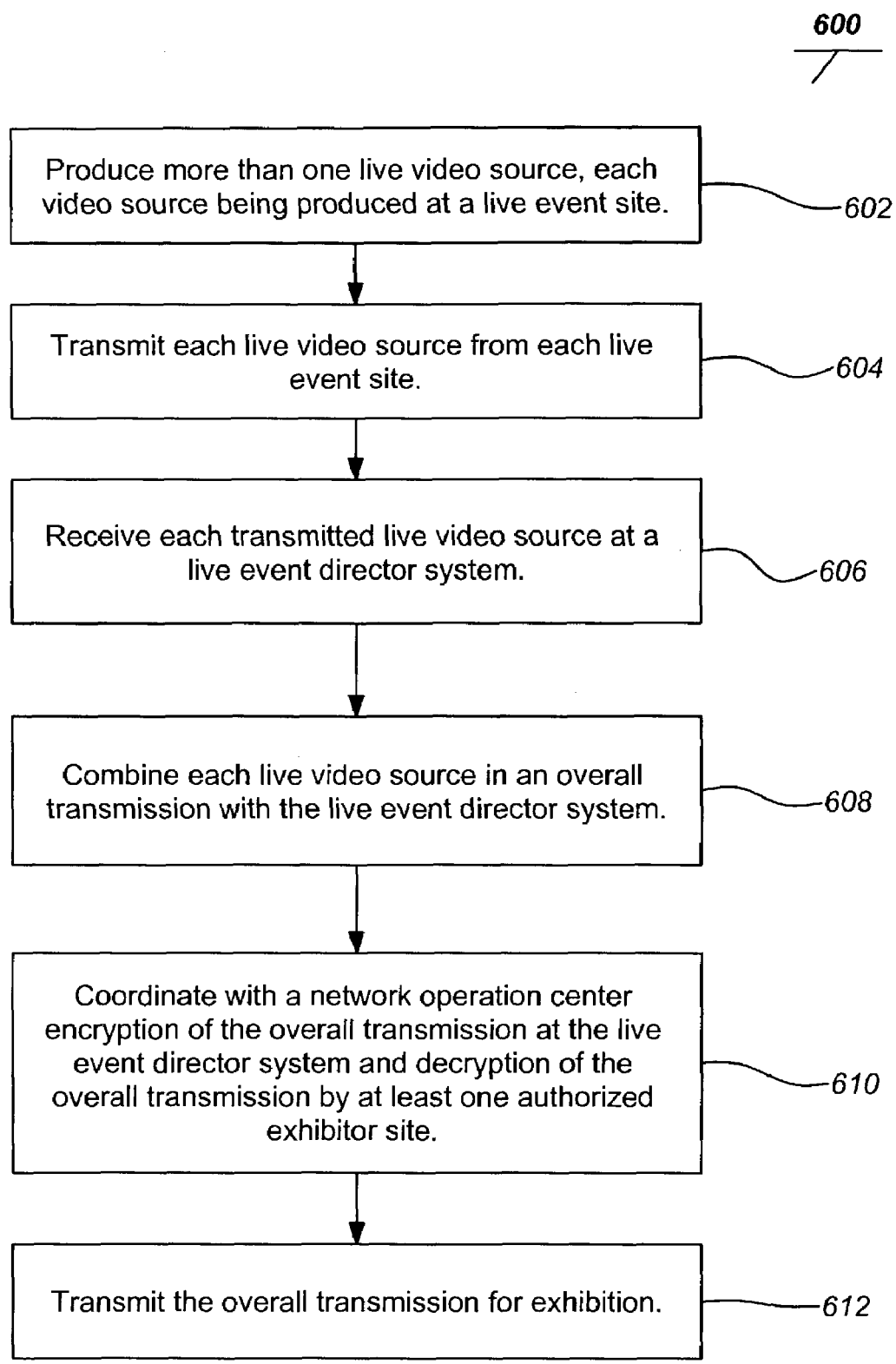
FIG. 6 is a flowchart of a typical method of the invention for secure exhibition of a live event from multiple sources.

FIG. 6 is a flowchart of a typical method 600 of the invention for secure exhibition of a live event from multiple sources. At block 602 more than one live video source is produced, each video source being produced at a live event site. Next, at block 604, each live video source is transmitted from each live event site. Each transmitted live video source is received at a live event director system at block 606. At block 608, each live video source is combined in an overall transmission with the live event director system. At block 610, a network operation center coordinates encryption of the overall transmission at the live event director system and decryption of the overall transmission by at least one authorized exhibitor site. Finally, at block 612 the overall transmission is transmitted for exhibition.

As discussed in the system description above, in further method embodiments overall bandwidth usage can similarly be reduced by receiving a low bandwidth signal of each video source at the live event director system from the plurality of live event sites. The high bandwidth signals of each video source from the live event sites are then selectively transmitted to the live event director system for use in the overall transmission to the authorized exhibitor sites.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A system comprising:
    (a) a plurality of live event sites each producing and transmitting a live video source in a low bandwidth signal;
    (b) a live event director system configured to:
        (i) receive and monitor the low bandwidth signal of each live video source from the plurality of live event sites;
        (ii) control the signal transmitted by each of the plurality of live event sites and determine which of the plurality of live event sites should transmit a high bandwidth signal to be used in an overall transmission and which of the plurality of live event sites should continue to transmit the low bandwidth signal;
        (iii) when a particular live video source from a particular live event site is required for the overall transmission, transmit a control signal to the particular live event site causing the particular live event site to transmit, via a satellite, a high bandwidth signal of the live video source; and
        (iv) receive the high bandwidth signal from the satellite; and
    (c) a network operation center for coordinating encryption of the overall transmission at the live event director system and decryption of the overall transmission by multiple exhibitor sites, wherein the overall transmission comprises the high bandwidth signal.

2. The system of claim 1, wherein the overall transmission is transmitted via satellite broadcast to more than one authorized exhibitor site.

3. The system of claim 2, wherein at least one decryption key for decrypting the overall transmission is communicated to the authorized exhibitors from the network operation center.

4. The system of claim 1, wherein the live video source comprises cinema quality video.

5. The system of claim 1, further comprising at least one exhibitor system, at one of the multiple exhibitor sites, for receiving the overall transmission from the live event director system.

6. The system of claim 5, wherein the exhibitor system includes:
    a receiver for receiving and extracting video data from the received overall transmission;
    data storage for buffering the video data;
    a decryption unit for decrypting the video data;
    a decompression unit decompressing the video data; and
    a display device for displaying the decrypted and decompressed video data.

7. The system of claim 1, wherein the overall transmission includes file encryption and conditional access encryption.

8. The system of claim 7, wherein the conditional access encryption is decrypted before the live video source is stored by authorized exhibitors and the file encryption is decrypted after the live video source is stored but before the overall transmission is played by authorized exhibitors.

9. The system of claim 1, wherein the live event director system communicates commands for controlling selective transmission to the plurality of live event sites over a control link to each of the live event sites.

10. The system of claim 1, wherein the high bandwidth signal of each live video source from the plurality of live event sites is selectively transmitted so substantially one high bandwidth signal is received by the live event director system at a time.

11. The system of claim 10, wherein the selective transmission of the high bandwidth signal of each live video source from the plurality of live event sites is synchronized using clocks at the plurality of live event sites and the live event director system.

12. The system of claim 1, wherein the live video source of each of the plurality of live event sites is compressed to the low bandwidth signal and communicated to the live event director system.

13. The system of claim 12, wherein each low bandwidth signal is communicated through a virtual private network (VPN) connection.

14. A method comprising:
    producing more than one live video source in a low bandwidth signal, each live video source being produced at one of a plurality of live event sites;
    receiving the low bandwidth signal of each live video source at a live event director system from the plurality of live event sites;
    monitoring the low bandwidth signals of each live video source at the live event director system;
    controlling the signal transmitted by each of the plurality of live event sites and determine which of the plurality of live event sites should transmit a high bandwidth signal to be used in an overall transmission and which of the plurality of live event sites should continue transmitting the low bandwidth signals;
    when a particular live video source from a particular live event site is required for the overall transmission, the live event director system transmits a control signal to the particular live event site causing the particular live event site to transmit, via a satellite, a high bandwidth signal of the live video source;
    receiving the transmitted high bandwidth signal of the live video source at the live event director system;
    forming an overall transmission comprised of the received high bandwidth signal at the live event director system;
    coordinating with a network operation center encryption of the overall transmission at the live event director system and decryption of the overall transmission by multiple exhibitor sites; and
    transmitting the overall transmission for exhibition.

15. The method of claim 14, wherein the overall transmission is transmitted via satellite broadcast to more than one authorized exhibitor site.

16. The method of claim 15, wherein the live video source comprises cinema quality video.

17. The method of claim 14, wherein at least one decryption key for decrypting the overall transmission is communicated to the authorized exhibitors from the network operation center.

18. The method of claim 14, wherein at least one exhibitor system at one of the multiple exhibitor sites receives the overall transmission from the live event director system.

19. The method of claim 14, further comprising exhibiting the overall transmission including:
   receiving and extracting video data from the received overall transmission at a receiver;
   buffering the video data with a data storage device;
   decrypting the video data with a decryption unit;
   decompressing the video data with a decompression unit; and
   displaying the decrypted and decompressed video data with a display device.

20. The method of claim 14, wherein the overall transmission includes file encryption and conditional access encryption.

21. The method of claim 20, wherein the conditional access encryption is decrypted before the live video source is stored by authorized exhibitors and the file encryption is decrypted after the live video source is stored but before the overall transmission is played by authorized exhibitors.

22. The method of claim 14, further comprising:
   communicating commands for controlling selective transmission to the plurality of live event sites over a control link to each of the live event sites from the live event director system.

23. The method of claim 14, wherein the high bandwidth signal of each live video source from the plurality of live event sites is selectively transmitted so substantially one high bandwidth signal is received by the live event director system at a time.

24. The method of claim 23, further comprising synchronizing the selective transmission of the high bandwidth signal of each live video source from the plurality of live event sites using clocks at the plurality of live event sites and the live event director system.

25. The method of claim 14, wherein the live video source of each of the plurality of live event sites is compressed to the low bandwidth signal and communicated to the live event director system.

26. The system of claim 25, wherein each low bandwidth signal is communicated through a virtual private network (VPN) connection.

* * * * *